United States Patent
Christmas

(10) Patent No.: US 6,308,510 B1
(45) Date of Patent: Oct. 30, 2001

(54) CHAIN

(75) Inventor: Michael Charles Christmas, Cheshire (GB)

(73) Assignee: Renold PLC, Manchester (GB)

( * ) Notice: Subject to any disclaimer, the term of this patent is extended or adjusted under 35 U.S.C. 154(b) by 0 days.

(21) Appl. No.: 09/380,148

(22) PCT Filed: Feb. 24, 1998

(86) PCT No.: PCT/GB98/00557

§ 371 Date: Dec. 1, 1999

§ 102(e) Date: Dec. 1, 1999

(87) PCT Pub. No.: WO98/38441

PCT Pub. Date: Sep. 3, 1998

(30) Foreign Application Priority Data

Feb. 27, 1997 (GB) .................................................. 9704040

(51) Int. Cl.[7] .............................. F16G 13/16; F16G 13/24
(52) U.S. Cl. ...................... 59/78; 59/4; 59/84; 474/206
(58) Field of Search .................... 59/5, 4, 78, 84; 474/202, 212, 220, 219

(56) References Cited

U.S. PATENT DOCUMENTS

| | | | |
|---|---|---|---|
| 647,046 | * 4/1900 | Tessier | 59/5 |
| 2,113,504 | * 4/1938 | Caute | 59/4 |
| 2,241,820 | 5/1941 | Kohn | 74/257 |
| 3,535,871 | * 10/1970 | Jeffrey | 474/212 |
| 3,877,688 | * 4/1975 | McCarty | 474/220 |
| 4,041,790 | * 8/1977 | Paul | 474/220 |
| 5,176,586 | * 1/1993 | Sugimoto | 474/212 |
| 5,322,483 | * 6/1994 | Wang | 474/206 |
| 5,345,753 | * 9/1994 | Okuda et al. | 59/5 |
| 6,171,209 | * 1/2001 | Matsuda | 474/213 |

FOREIGN PATENT DOCUMENTS

| | | |
|---|---|---|
| 295 14 700 U | 11/1995 | (DE) . |
| 0 652 389 A | 5/1995 | (WO) . |

* cited by examiner

*Primary Examiner*—David Jones
(74) *Attorney, Agent, or Firm*—Akin Gump Strauss Hauer & Feld LLP

(57) ABSTRACT

A drive chain comprises a plurality of inner links (1) interconnected by intermediate outer links and elongate pins (7) that are received in apertures in the inner and outer links. There is substantial clearance between the outer link and the corresponding inner links so as to permit flexion of the adjacent elongate pins in a direction substantially parallel to the length of the chain. The outer link may be in the form of a separate plate (6) or may be an integral part of the pins. In one embodiment the outer link is a crimped plate that offers resilience in the direction of the chain. The drive chains provide for shock absorption.

7 Claims, 2 Drawing Sheets

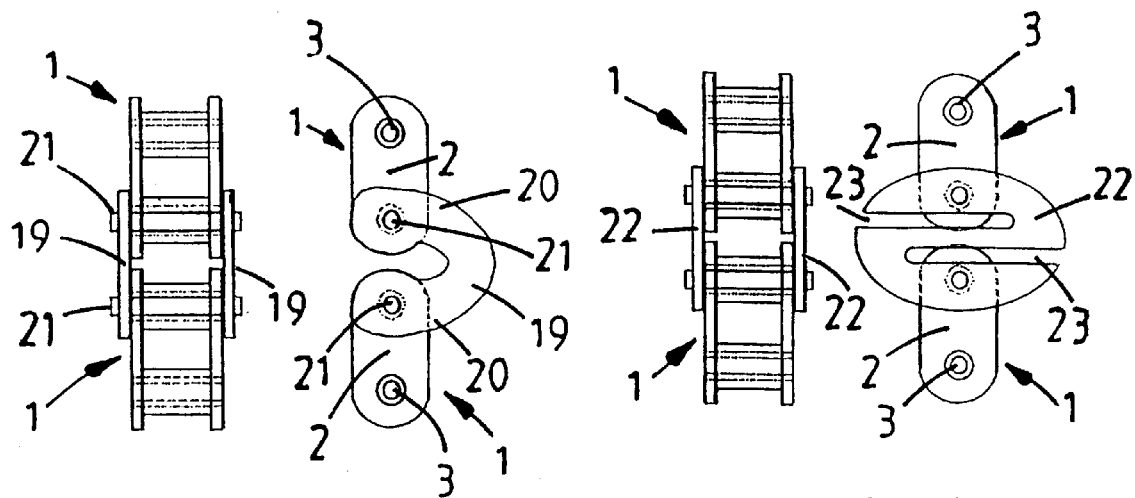
FIG. 6
FIG. 7
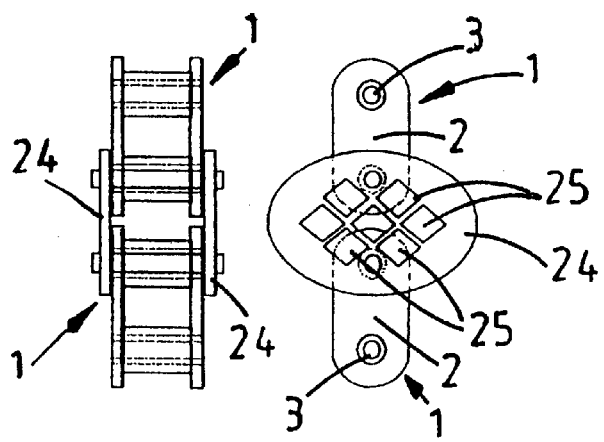
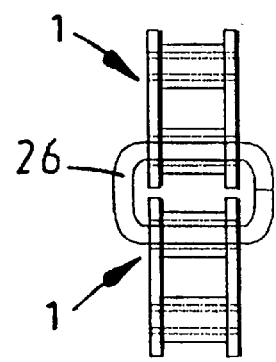
FIG. 8
FIG. 9
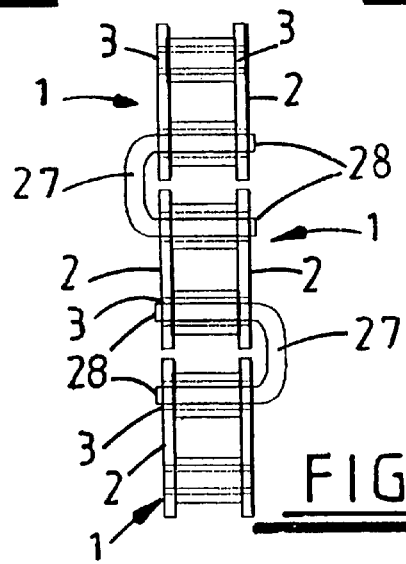
FIG. 10

CHAIN

CROSS-REFERENCE TO RELATED APPLICATIONS

Priority is claimed to British Patent Application No. 9704040.6, filed Feb. 27, 1997, and to PCT Application No. PCT/GB98/00557, filed Feb. 24, 1998.

BACKGROUND OF THE INVENTION

The present invention relates to a chain and more particularly, but not exclusively, to a drive chain or lifting chain of the kind having a plurality of inner links connected by intermediate outer links.

Conventional roller chains comprise a sequence of inner links interconnected by intermediate outer links and pins which are received in said inner links and are secured by interference fit in holes provided in the outer links. Each pin is located in a fixed bush which supports a rotatable cylindrical roller and which extends between opposed inner link plates. In some harsh applications shock loads to a drive or lifting arrangement are carried by the chain resulting in chain failure through fatigue.

SUMMARY OF THE INVENTION

It is an object of the present invention to obviate or mitigate the aforesaid disadvantage by providing for a shock absorbing drive or lifting chain and/or a low cost chain.

According to a first aspect of the present invention there is provided a chain comprising a plurality of inner links each having at least one elongate pin, adjacent elongate pins of neighbouring inner links being connected together by an outer link portions, wherein there is sufficient spacing between an outer link portion and the corresponding inner links so as to permit flexing of the adjacent elongate pins in a direction substantially parallel to the length of the chain.

It is the capacity of the elongate pins to flex that advantageously provides the chain with a shock absorption capability when it is subject to harsh or sudden loads.

An outer link portion may be provided at each end of the adjacent elongate pins so as to form a closed loop.

The or each outer link portion, for example, may integral with each of the adjacent elongate pins. Alternatively, the or each outer link portion may be a separate link plate secured to ends of adjacent elongate pins, in which case the or each outer link plate is preferably secured to the elongate pin ends by means of an interference fit.

The elongate pins may each be fitted with a collar so that their lateral movement relative to the inner links is prevented. Such a collar is preferably an interference fit on the pin, however, it may take the form of a spacer extending along the length of the elongate pin between the inner link and the outer link portion.

Preferably the outer link portion is resiliently flexible in a direction parallel to the chain length. Each outer link portion may be in the form of a crimped plate, a crimped portion of which is resiliently extensible. A plurality of such outer link portions may be connected between adjacent elongate pins.

According to a second aspect of the invention there is provided a drive chain comprising a plurality of inner links each having at least one pin that is received in apertures in the inner links, adjacent pins of neighbouring inner links being connected together by an outer link portion, wherein the outer link portion is resiliently flexible in a direction along the length of the chain.

The outer link portion may, for example, be an oval shaped plate having an aperture, a U-shaped plate with adjacent pins being received in apertures in each limb of the U-shape or an S-shaped plate.

The S-shaped plate is preferably formed from spaced slots extending from opposed edges of the plate, the slots extending in a direction perpendicular to the length of the chain.

The oval shaped plate may a single central aperture or alternatively a plurality of apertures that may be in the form of diamond shaped cut-outs.

According to a third aspect of the present invention there is provided a drive chain comprising a plurality of inner links interconnected by connection links having parallel limbs that pass through apertures in the inner links and at least one integral portion interconnecting the limbs, wherein the connection links are open at one end to define a U-shape.

The connection link may be open at one end to define a U-shape or, alternatively may be closed at both ends to define a closed loop.

BRIEF DESCRIPTION OF THE DRAWINGS

Specific embodiments of the present invention will now be described, by way of example only, with reference to the accompanying drawings in which:

FIG. 6 shows plan and side views of part of a sixth embodiment of a drive chain according to the present invention;

FIG. 7 shows plan and side views of part of a seventh embodiment of a drive chain according to the present invention;

FIG. 8 shows plan and side views of part of a eighth embodiment of a drive chain according to the present invention;

FIG. 9 is a plan view of part of a ninth embodiment of a drive chain according to the present invention; and FIG. 10 is a plan view of part of a tenth embodiment of a drive chain according to the present invention.

DETAILED DESCRIPTION OF THE INVENTION

Figure 1:
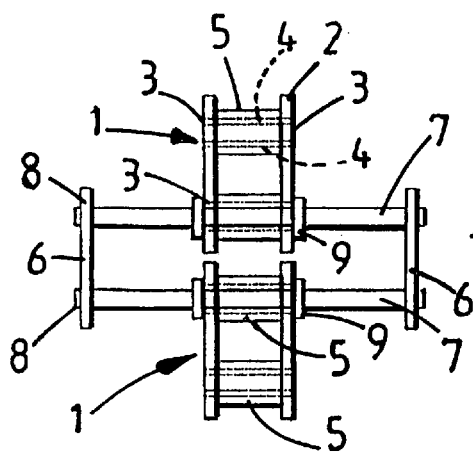
FIG. 1 is a plan view of part of a first embodiment of a drive chain according to the present invention.

Referring now to the drawings, FIG. 1 shows part of a roller and bush chain comprising a plurality of inner links 1 that are of conventional design. Each inner link 1 comprises a pair of opposed inner link plates 2 each of which has a pair of apertures 3 and is connected to the opposed plate by two bushes 4 (shown in dotted line) whose ends engage in the apertures 3. Each bush 4 supports a rotary cylindrical roller 5 between the inner link plates.

Adjacent inner links 1 are interconnected by flanking outer link plates 6 that are mounted on elongate pins 7 passing through the bushes 5 and the inner link plates 2. Each elongate pin 7 is rotatably received in the bush 5 and extends well beyond the inner link plates 2 on each side. The end of each elongate pin 7 is connected to an adjacent elongate pin 7 of the neighbouring inner link 1 by means of the outer link plate 6 which is secured on the ends of the said adjacent elongate pins 7 by means of an interference fit between the elongate pin 7 and apertures 8 provided in the outer link plate 6. It will be understood that, as in a conventional roller chain, the inner links 1 are pivotal relative to the outer link plates 6 and the elongate pins 7 on which they are mounted. In order to prevent lateral movement of the pins 7 relative to the inner links 1, washers 9 are mounted with interference fit on the pins 7, each washer 9 abutting an outwardly facing surface of the inner link plate 2.

It will be seen from FIG. 1 that there is a significant lateral clearance between the inner and outer link plates 1,2 by virtue of the extended length of the pins 7 compared to that of a conventional roller chain. This design permits the elongate pins 7 to flex in a direction parallel to the chain length when the chain is under load, thereby providing shock absorption. The length and flexibility of the pins 7 can be selected according to the application.

Figure 2:
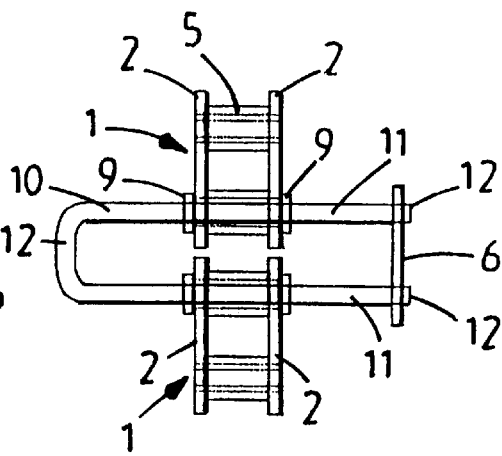
FIG. 2 is a plan view of part of a second embodiment of a drive chain according to the present invention.
Figure 3:
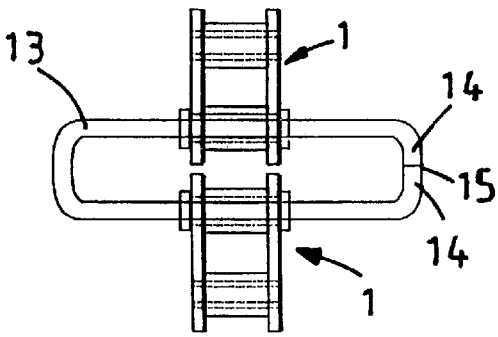
FIG. 3 is a plan view of part of a third embodiment of a drive chain according to the present invention.
Figure 4:
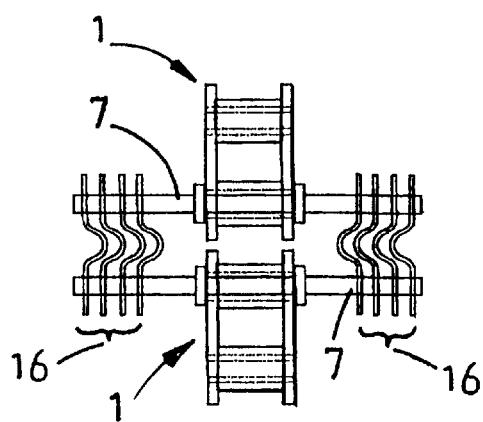
FIG. 4 is a plan view of part of a fourth embodiment of a drive chain according to the present invention.

Variations of the chain design of FIG. 1 are shown in FIGS. 2 to 4. Components common to the two designs are given the same reference numeral and are not described except insofar as they differ from their counterparts.

In FIG. 2 adjacent inner links 1 of the shock absorbing drive lifting chain are interconnected by a U-shaped pin 10, the limbs 11 of the U-shape corresponding to the pins of the design in FIG. 1 and the base 12 of the U-shape replacing one of the outer link plates. The U-shaped pin 10 is closed by an outer link plate 6 connected to the two ends 12 of the pin 10 in the same way as that described in relation to the design of FIG. 1.

In FIG. 3 the adjacent inner links 1 are interconnected by a single pin 13 that is bent into an enclosed ring shape. Ends 14 of the pin 13 are joined by means of, for example, a weld 15.

In the embodiment shown in FIG. 4 each outer link plate of the design shown in FIG. 1 is replaced by a plurality of parallel crimped plates 16 spaced along the protruding ends of the elongate pins 6. Each crimped plate 16 is made, for example, of spring steel and permits elastic extension of the plates under load thereby giving the chain resilience in the longitudinal direction. The number of crimped plates 16 can be selected according to the application. In the simplest design a single crimped plate 16 is connected to each end of adjacent pins of conventional length i.e. the crimped plate replaces an outer link plate of a conventional roller and bush chain. The plates could be manufactured from other resilient elastic material such as a polymer.

FIGS. 5 to 8 show different embodiments of a shock absorbing chain in which the outer link plates are designed to deflect under load. The shape of the outer link plates is designed such that under load the plates are subject not only to a tensile load (as in the outer link of a conventional link) but also to a bending moment. Each of the outer link plates is connected with interference fit to pins of a conventional length such that there is no or little clearance between adjacent inner and outer link plates.

Figure 5:
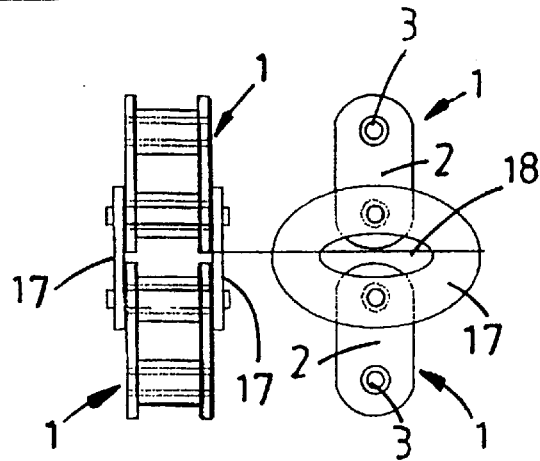
FIG. 5 shows plan and side views of part of a fifth embodiment of a drive chain according to the present invention.

The outer link plate 17 of FIG. 5 is, in side view, of general oval configuration with a central oval aperture 18. In FIG. 6 the outer link plate 19 is U-shaped being formed from approximately half of the outer link plate of FIG. 5. Ends of the limbs 20 of the U-shaped plate are connected to pins 21 of conventional length by means of an interference fit. It is to be understood that outer link plates of this configuration could be used in the designs of FIGS. 1 and 2 in which elongate pins are used.

In FIG. 7 the outer link plate 22 is again of generally oval configuration but has two parallel spaced slots 23 that extend in a direction substantially perpendicular to the longitudinal length of the chain (as indicated by the arrow). The slots 23 commence at opposite edges of the outer link plate 22 and terminate at a distance short of the opposing edge thereby forming an S-shaped outer link plate 22.

The outer link plate 24 of FIG. 8 is of oval shape with a plurality of diamond-shaped apertures or cut-outs 25.

In FIG. 9 there is shown a lifting chain in which the inner links 1 are interconnected by a pin 26 that is bent to form a closed ring in the same manner as the embodiment shown in FIG. 3. The pin 26 is smaller than that shown in FIG. 3 and therefore does not offer the same shock absorption facility. However, this pin design may be used as shown instead of the outer link plates of a conventional drive chain.

A variation of the design of FIG. 9 is shown in FIG. 10. Here adjacent inner links 1 are interconnected by U-shaped pins 27 arranged along the chain such that they alternately face in opposite directions. Free ends 28 of the pins engage with apertures 3 in the inner link plates 2 in an interference fit. This arrangement permits the chain to flex both along its length and laterally thereto thereby providing shock absorption under load.

It will be appreciated that numerous modifications to the above described design may be made without departing from the scope of the invention as defined in the appended claims. For example, the interference fit washers shown in the embodiments of FIGS. 1 to 4 may be replaced by spacers that extend along the length of the pin between the inner link plate and the outer link plate or its equivalent. Moreover, it will be understood that the embodiments shown in FIGS. 5 to 8 are shown as examples only of a chain with a resiliently flexible outer link and that there are many other equivalent designs that are contemplated.

What is claimed is:

1. A shock absorbing chain comprising:
   a plurality of inner links, each link containing at least a first aperture;
   plurality of crimped outer link plates which are resiliently flexible in the longitudinal direction of the chain to absorb shock loading applied to the chain, each outer link containing at least a second aperture for alignment with said first aperture; and
   a pin contained within said first and second apertures for securing said inner and outer links.

2. A shock absorbing chain according to claim 1, wherein said outer link is laterally spaced from said inner link.

3. A shock absorbing chain according to claim 1, wherein said outer links are sufficiently spaced along said pin from said inner links to permit said pin and said outer link to flex in a direction parallel to the length of the chain.

4. A shock absorbing chain comprising:
   a plurality of inner links, each link containing at least a first aperture;
   a plurality of outer link plates containing slots forming an S-shaped plate, said outer link plates absorbing shock loading applied to the chain, each outer link plate containing at least a second aperture, spaced apart from said slots, for alignment with said first aperture; and
   a pin contained within said first and second apertures for securing said inner and outer links.

5. A shock absorbing chain according to claim 4, wherein said slots extend perpendicular to the longitudinal direction of the chain.

6. A shock absorbing chain according to claim 5, wherein said slots extend from opposed edges of said outer link plate.

7. A shock absorbing chain according to claim 6, wherein said slots extend in substantially parallel directions.

* * * * *